Patented Oct. 22, 1935

2,018,350

UNITED STATES PATENT OFFICE 2,018,350

PRODUCTION OF ALDEHYDES FROM DICARBOXYLIC ACIDS

Otto Drossbach and Adolf Johannsen, Ludwigshafen-on-the-Rhine, Germany, assignors to General Aniline Works, Inc., New York, N. Y., a corporation of Delaware No Drawing. Application January 18, 1927, Serial No. 161,953. In Germany January 28, 1926

3 Claims. (Cl. 260—136)

We have found that aldehydes may be prepared in a simple manner from dicarboxylic acids by treating the dicarboxylic acids which may be employed in the form of free acids or of their anhydrides, with reducing gases at an elevated temperature and in the presence of catalysts. Such catalysts may be of a varied nature. Among others, hydrogenation catalysts are very suitable. As examples of very suitable contact masses which may be employed with good result, the elements of the 5th to 11th group of the periodic system (as suggested by Paneth, Zeitschrift für angewandte Chemie, 1923, volume 36, page 409 Tab. 2), such as chromium, iron, copper, manganese, and cobalt or their oxids, either alone or in mixture with each other, may be mentioned. These catalysts give particularly good results when employed in mixture with other elements, for example lead, glucinium, cerium, uranium, or zinc or oxids of these elements. For example, according to this manner of working benzaldehyde may readily be obtained from phthalic anhydride and propionic aldehyde from succinic anhydride or maleic anhydride.

The reducing gases employed may consist for example, of hydrogen or gaseous mixtures containing hydrogen, or also of mixtures containing carbon monoxide and water vapor. The relative proportions of dicarboxylic acid, or dicarboxylic anhydride, and the reducing gases may vary within wide limits and the unconsumed gas may be returned to the process in the usual way. The operation may be carried out under any suitable pressure. The resulting aldehydes may either be recovered as such, or they may be converted into the corresponding alcohols by further reduction, by means, if necessary, of a secondary contact substance, preferably maintained at a lower temperature. The temperature must be high enough to carry the conversion beyond the stage of the formation of lactones, and generally speaking will be above 200° C.

The following examples will further illustrate how the said invention may be carried out into practical effect, but the invention is not limited to the examples.

Example 1

Phthalic anhydride, in the form of vapor and mixed with hydrogen, is brought into contact with an iron catalyst at a temperature of 400° C. The said catalyst consists of granules of pumice impregnated with an iron salt and reduced with hydrogen. A good yield of benzaldehyde, together with a little benzoic acid and benzol is obtained.

Example 2

A mixture of water vapor, carbon monoxide and phthalic anhydride vapor is brought into contact, at a temperature of 370° C., with a catalyst prepared by reducing fragments of ferric oxid preferably activated by chromium compounds. On the reaction mixture being cooled, nearly pure benzaldehyde separates out, together with water.

Example 3

Succinic anhydride, in the form of vapor and mixed with hydrogen, is passed, at a temperature of 250° C. over a catalyst composed of equal parts of copper and iron deposited on granular pumice by methods already known. The main product consists of propionic aldehyde. Maleic anhydride may be used in place of succinic anhydride, in which case under suitable conditions, hydrogenation of the double bond takes place at the same time.

Example 4

A dry gas mixture consisting of 90 per cent of nitrogen and 10 per cent of hydrogen is passed over fused phthalic anhydride heated to 170° C. The gas mixture is then brought, at 360° C., into contact with a catalyst prepared by reducing an intimate mixture of lead oxid, chromium oxid and iron oxid. On cooling the resulting gas and vapor mixture, benzaldehyde free from unaltered phthalic anhydride and from benzoic acid separates out. Instead of the said catalyst, a contact mass prepared by reducing zinc chromate may be employed with good result. The mixture of nitrogen and hydrogen may be replaced by water gas or other gas mixtures containing hydrogen.

What we claim is:

1. The process of producing aldehydes which comprises treating a dicarboxylic acid substance with a reducing gas at a temperature between 200° C. and 400° C. in the presence of a hydrogenation catalyst activated by the addition thereto of a substance selected from the group consisting of lead, glucinium, cerium, uranium, chromium, iron, copper, manganese and cobalt and the oxides of these metals, the metal contained in the activating constituent being different from the metal contained in the hydrogenation catalyst.

2. The process of producing aldehydes which comprises treating a dicarboxylic acid with a gas containing free hydrogen at a temperature between 200° C. and 400° C. in the presence of a hydrogenation catalyst activated by the addition thereto of a substance selected from the group consisting of lead, glucinium, cerium, uranium, chromium, iron, copper, manganese and cobalt and the oxides of these metals, the metal contained in the activating constituent being different from the metal contained in the hydrogenation catalyst.

3. The process of producing aldehydes which comprises treating a dicarboxylic anhydride with a gas containing free hydrogen at a temperature between 200° C. and 400° C. in the presence of a hydrogenation catalyst activated by the addition thereto of a substance selected from the group consisting of lead, glucinium, cerium, uranium, chromium, iron, copper, manganese and cobalt and the oxides of these metals, the metal contained in the activating constituent being different from the metal contained in the hydrogenation catalyst.

OTTO DROSSBACH.
ADOLF JOHANNSEN.